United States Patent
Marutani et al.

(10) Patent No.: US 11,945,920 B2
(45) Date of Patent: Apr. 2, 2024

(54) THERMOSENSITIVE FINE PARTICLES

(71) Applicant: NITTA Corporation, Osaka (JP)

(72) Inventors: Kosuke Marutani, Yamatokohriyama (JP); Satoshi Yamaguchi, Yamatokohriyama (JP); Takashi Megumi, Yamatokohriyama (JP); Hikaru Ito, Yamatokohriyama (JP); Takumi Kato, Yamatokohriyama (JP); Koji Yamashita, Yamatokohriyama (JP)

(73) Assignee: NITTA CORPORATION, Osaka (JP)

( * ) Notice: Subject to any disclaimer, the term of this patent is extended or adjusted under 35 U.S.C. 154(b) by 0 days.

(21) Appl. No.: 17/793,230

(22) PCT Filed: Jan. 15, 2021

(86) PCT No.: PCT/JP2021/001232
§ 371 (c)(1),
(2) Date: Jul. 15, 2022

(87) PCT Pub. No.: WO2021/145422
PCT Pub. Date: Jul. 22, 2021

(65) Prior Publication Data
US 2023/0074903 A1    Mar. 9, 2023

(30) Foreign Application Priority Data
Jan. 16, 2020  (JP) ................. 2020-005073

(51) Int. Cl.
*C08L 33/06* (2006.01)
*C08J 3/21* (2006.01)
*C08L 23/06* (2006.01)

(52) U.S. Cl.
CPC ............. *C08J 3/212* (2013.01); *C08L 23/06* (2013.01); *C08J 2323/06* (2013.01); *C08J 2433/08* (2013.01)

(58) Field of Classification Search
CPC .... C08J 3/212; C08J 2323/06; C08J 2323/08; C08L 23/06; C08L 23/0815; C08L 23/0853; C08L 33/06; C08L 101/00; C08F 220/1818; C08F 20/18; C08F 20/68

USPC ........................................................ 524/585
See application file for complete search history.

(56) References Cited

U.S. PATENT DOCUMENTS

| 2007/0146576 A1* | 6/2007 | Hasegawa ......... G02F 1/133365 349/88 |
|---|---|---|
| 2010/0247900 A1 | 9/2010 | Parker et al. |
| 2014/0100335 A1 | 4/2014 | Doi et al. |

FOREIGN PATENT DOCUMENTS

| JP | 09-251923 A | 9/1997 |
| JP | 2009-163106 A | 7/2009 |
| JP | 2012-172063 A | 9/2012 |
| JP | 2013-097321 A | 5/2013 |
| JP | 2013-166910 A | 8/2013 |
| JP | 2014-101423 A | 6/2014 |
| WO | 2015/068723 A1 | 5/2015 |

OTHER PUBLICATIONS

Extended European Search Report dated Jan. 29, 2024 for European Patent Application No. 21741079.4.
Yusof, N. H., "Preparation and characterization of poly(stearyl methacrylate) grafted natural rubber in latex stage" Nagaoka University of Technology, Nagaoka, Japan, (2015).
Goswami, P.K., "Poly(Glycidyl Methacrylate-co-Octadecyl Methacrylate) particles by dispersion radical copolymerization," Journal of Dispersion Science and Technology, (2019).
Derry, M., "A Vesicle-to-Worm Transition Provides a New High-Temperature Oil Thickening Mechanism,"A Journal of the German Chemical Society, (2017).

* cited by examiner

*Primary Examiner* — Hannah J Pak
(74) *Attorney, Agent, or Firm* — Volpe Koenig

(57) ABSTRACT

Thermosensitive fine particles of the present invention include a side chain crystal polymer which is crystallized at a temperature lower than a melting point and which exhibits fluidity at a temperature equal to or more than the melting point. The side chain crystal polymer may include, as a monomer component, a (meth)acrylate having a straight-chain alkyl group having 14 or more carbon atoms. A mean particle diameter of the fine particles may be 0.1 to 50 μm. The thermosensitive fine particles may include no organic solvents.

6 Claims, 1 Drawing Sheet

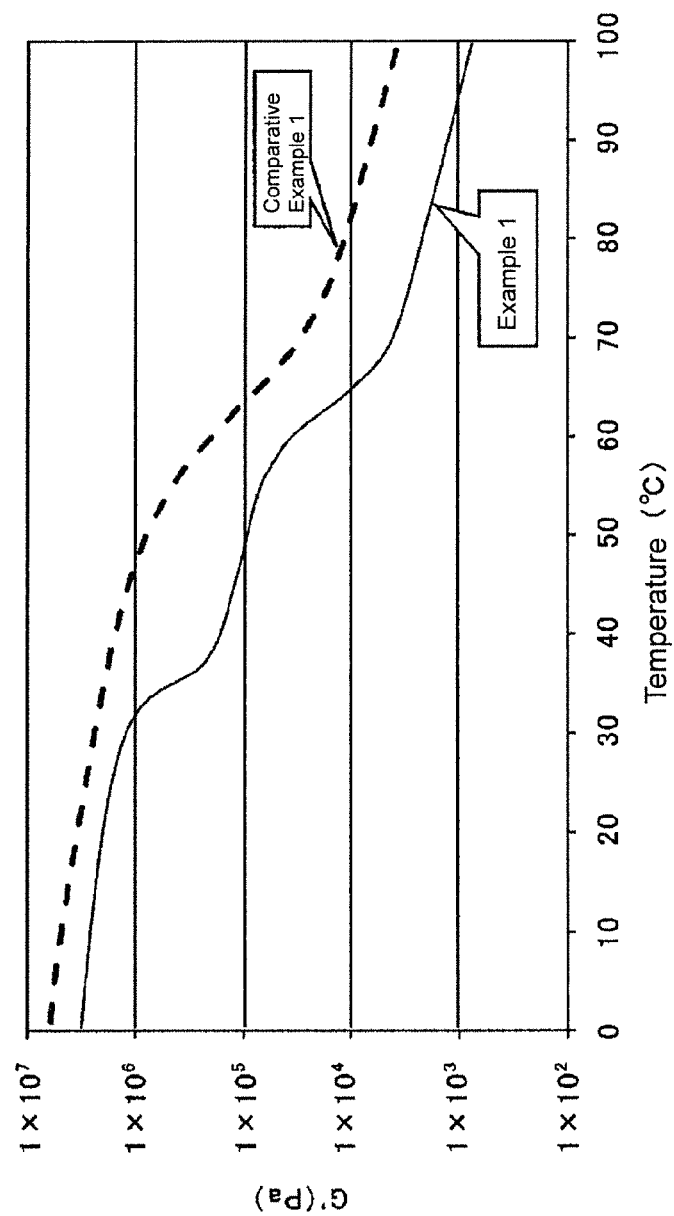

THERMOSENSITIVE FINE PARTICLES

TECHNICAL FIELD

The present invention relates to thermosensitive fine particles.

BACKGROUND

A side chain crystal polymer having thermosensitivity that reversibly causes a crystal state and a fluid state correspondingly to a temperature change is known (refer to, for example, Patent Document 1). Conventional side chain crystal polymers such as the one described in Patent Document 1 are often synthesized in organic solvent systems, and are often processed into forms such as tapes and used for adhesive uses.

PRIOR ART DOCUMENT

Patent Document

Patent Document 1: Japanese Unexamined Patent Publication No. H9-251923

SUMMARY

Problems to be Solved by the Invention

An object of the present invention is to provide thermosensitive fine particles that can be added to various resin materials and that impart thermosensitivity.

Means of Solving the Problems

Thermosensitive fine particles of the present invention include a side chain crystal polymer which is crystallized at a temperature lower than a melting point and which exhibits fluidity at a temperature equal to or more than the melting point.

Effects of the Invention

According to the present invention, the effects that they can be added to various resin materials and can impart thermosensitivity can obtained.

BRIEF DESCRIPTION OF THE DRAWINGS

FIG. 1 is a graph showing measurement results of storage elastic modulus G' in Example 1.

EMBODIMENTS FOR CARRYING OUT THE INVENTION

<Thermosensitive Fine Particles>

Thermosensitive fine particles (hereinafter referred to as "fine particles") according to an embodiment of the present invention is described in detail below.

The fine particles of the present embodiment include a side chain crystal polymer which is crystallized at a temperature lower than a melting point and which exhibits fluidity at a temperature equal to or more than the melting point.

The above-described configuration produces the effects that the thermosensitive fine particles can be added to various resin materials and can impart thermosensitivity. Specifically, the above-described side chain crystal polymer is a polymer having a melting point. The melting point denotes a temperature at which a specific portion of the polymer initially aligned in an orderly array enters a disordered state by a certain equilibrium process, and the temperature is a value obtainable from a measurement under measuring condition of 10° C./min by using a differential scanning calorimetry (DSC). The side chain crystal polymer is crystallized at a temperature lower than the melting point, and it is subjected to phase transition and exhibits fluidity at a temperature equal to or more than the melting point. That is, the side chain crystal polymer has thermosensitivity that reversibly causes a crystal state and a fluid state correspondingly to a temperature change. Since the fine particles include such side chain crystal polymer, they have thermosensitivity derived from the side chain crystal polymer.

If the side chain crystal polymer is set to be in the form of fine particles, it is less affected by type and ratio of a resin which becomes a base (hereinafter referred to as "base resin") and a dispersion state of the side chain crystal polymer in the base resin is less likely to change, and therefore, the side chain crystal polymer can be added to various resin materials, and the thermosensitivity derived from the side chain crystal polymer can be imparted. Additionally, if the fine particles of the present embodiment are added to resin materials, it is possible to control and express physical properties such as elastic modulus control, optical property control, gas permeability control, surface modification, and heat storage/radiation functions in the base resin by temperature.

The melting point of the side chain crystal polymer is preferably 20 to 100° C. The melting point can be adjusted by changing, for example, a composition of monomer component constituting the side chain crystal polymer. As a specific example, the melting point can be adjusted by changing a length of the side chain in the side chain crystal polymer. If the length of the side chain is increased, the melting point tends to be higher.

The side chain crystal polymer includes, as a monomer component, a (meth)acrylate having a straight-chain alkyl group having 14 or more carbon atoms. In the (meth)acrylate having the straight-chain alkyl group having 14 or more carbon atoms, the straight-chain alkyl group having 14 or more carbon atoms functions as a side chain crystal part in the side chain crystal polymer. In other words, the side chain crystal polymer is a comb-shaped polymer having straight-chain alkyl group having 14 or more carbon atoms in its side chain, and it is crystallized by aligning this side chain into an orderly arrangement by intermolecular force or the like. The (meth)acrylate described above denotes acrylate or methacrylate. An upper limit of the carbon atoms is preferably 50 or less.

Examples of the (meth)acrylate having the straight-chain alkyl group having 14 or more carbon atoms includes cetyl (meth)acrylate, stearyl (meth)acrylate, eicosyl (meth)acrylate, and behenyl (meth)acrylate. Only one kind of the illustrated (meth)acrylates may be used, or two or more kinds of them may be used in combination.

The monomer component constituting the side chain crystal polymer may include other monomers that can be copolymerized with the (meth)acrylate having the straight-chain alkyl group having 14 or more carbon atoms. Examples of the other monomers include a monofunctional monomer and a multifunctional monomer. In other words, the side chain crystal polymer may include a monofunctional monomer or a multifunctional monomer as a monomer component.

Examples of the monofunctional monomer include (meth) acrylates having an alkyl group having 1 to 12 carbon atoms such as methyl (meth)acrylate, ethyl (meth)acrylate, butyl (meth)acrylate, hexyl (meth)acrylate, lauryl (meth)acrylate, 2-ethylhexyl acrylate. Only one of the illustrated monofunctional monomers may be used, or two or more may be used in combination. When any function is to be added in addition to the thermosensitivity, any monomer that can be copolymerized with (meth)acrylate having the straight-chain alkyl group having 14 or more carbon atoms and that has the function can be freely copolymerized.

The multifunctional monomer can function as a component that crosslinks the side chain crystal polymer. It is preferable to use a multifunctional monomer from the viewpoint of dispersion state, deformation control, and retention of repeatability of functions at the time of use. In other words, the side chain crystal polymer preferably includes the multifunctional monomer as a monomer component. The multifunctional monomer has two or more, preferably two to four, radical polymerizable double bonds in the molecule. Examples of the multifunctional monomer include bifunctional (meth)acrylate, trifunctional (meth)acrylate, and tetrafunctional (meth)acrylate. Specific examples include 1,6-hexanediol di(meth)acrylate, 1,9-nonanediol di(meth)acrylate, trimethylolpropane tri(meth)acrylate, pentaerythritol tetra(meth)acrylate, polyethylene glycol 200 di(meth)acrylate, and ethoxylated bisphenol A di(meth)acrylate. Only one of the illustrated multifunctional monomers may be used, or two or more may be used in combination. The multifunctional monomer may be at least one selected from bifunctional (meth) acrylate, trifunctional (meth) acrylate, and tetrafunctional (meth) acrylate.

A preferred composition of the side chain crystal polymer may be 20 to 100 parts by weight of the (meth)acrylate having the straight-chain alkyl group having 14 or more carbon atoms, 0 to 40 parts by weight of the monofunctional monomer, and 0 to 10 parts by weight of the multifunctional monomer.

A mean particle diameter of the fine particles is preferably 0.1 to 50 μm, more preferably 1.5 to 50 μm. By this configuration, the dispersion state of the fine particles in the base resin is easily controlled. The mean particle diameter is a value obtained by image processing a scanning electron microscope (SEM) photograph. More specifically, it is a value obtained by taking a SEM photograph of the fine particles by using a SEM, randomly selecting 30 particles by image processing the obtained SEM photograph and calculating the average value.

A shape of the fine particles is preferably spherical. By this configuration, the dispersion state of the fine particles in the base resin is easily stabilized. The fine particles may include particles having a sphericity of 0.7 or more, in number average of preferably 70% or more, more preferably 70 to 100%. In this case, the dispersion state of the fine particles in the base resin is stable. The sphericity is a ratio of the short diameter to the long diameter. The sphericity and sphericity distribution are values obtained by image processing of the SEM photograph. An upper limit of the sphericity is not particularly limited, but it may be 0.99 or less.

A ratio [(a storage elastic modulus G' at a melting point-10° C.)/(a storage elastic modulus G' at a melting point+10° C.)] is preferably $1 \times 10^2$ or more, more preferably $1 \times 10^2$ to $1 \times 10^7$. By this configuration, the side chain crystal polymer changes abruptly from a crystal state to a fluid state at the melting point, and thus it becomes easy to control and express physical properties such as elastic modulus control, optical property control, gas permeability control, surface modification, and heat storage/radiation functions in the base resin by temperature.

The storage elastic modulus G' at the melting point-10° C. is preferably $1 \times 10^6$ to $1 \times 10^9$ Pa. The storage elastic modulus G' at the melting point+10° C. is preferably $1 \times 10^2$ to $1 \times 10^5$ Pa. The storage elastic modulus G' is a value obtained by measuring by a dynamic viscoelasticity measuring device. The storage elastic modulus G' can be adjusted by changing, for example, a composition of monomer component constituting the side chain crystal polymer.

The fine particles preferably include no organic solvents. By this configuration, there is no effect of compatibility on the base resin, and the dispersion state of the fine particles in the base resin is easily stabilized. Additionally, solvent resistance is improved, and they are less likely to bleed out. When the monomer component is polymerized without using organic solvents, the fine particles can be set in a state in which the organic solvents are not included.

The fine particles may be obtained by aqueous polymerization of monomer component. A surfactant (emulsifier) may be used in polymerizing the monomer component. In this case, the obtained side chain crystal polymer may include a surfactant. In other words, the side chain crystal polymer may include a surfactant.

The fine particles can be used suitably as a thermosensitive imparting agent. It means that, according to the present embodiment, the thermosensitivity can be imparted to resin materials by a simple method of adding the fine particles to the resin materials. Examples of the base resin include a polyethylene terephthalate resin, a polyvinyl chloride resin, an ethylene-methyl methacrylate copolymer resin, a polycarbonate, a methyl methacrylate resin, an acrylic resin, an epoxy resin, a polyamide resin, polyurethane, polyvinyl butyral, polyurethane, polyvinyl butyral, polyvinyl acetate, an ethylene vinyl acetate copolymerization resin (EVA), and a polyolefin resin. Examples of the polyolefin resin include a polyethylene resin. The base resins are not limited to the illustrated ones. The fine particles can also be added to inks and other materials.

The fine particles can be suitably used in various uses. For example, fine particles may be used for adhesion, light control, plasticizer, mold release, surface modification, volatile gas permeation or the like. The uses of the fine particles are not limited to the illustrated ones.

(For Light Control)

A case where fine particles are for light control is described below.

The fine particles can be added to a base resin of a light control film to control transparency and non-transparency of the light control film, that is to express the light control function (turbidity change) in the light control film. An effect of controlling the transparency and the non-transparency of the light control film by temperature can be obtained by adding the fine particles to the base resin of the light control film.

Specifically, a light control mixture utilizing the difference in temperature dependences of refractive indexes between the base resin and the additive is known (refer to, for example, Japanese Unexamined Patent Publication No. S51-132241). The light control mixture has a property that it becomes transparent when the difference in the refractive index is small, and it gets white turbid or the like and becomes non-transparent when the difference in the refractive index is large, so that it becomes transparent at room temperature and non-transparent at high temperature. However, the above-described light control mixture does not have an inflection point, so the change is slow, and it is difficult to recognize the change without a large temperature difference. Additionally, it is difficult to control the temperature at which the light control film changes, and even if it could be controlled, it would be difficult to maintain the properties of the base resin.

The fine particles of the present embodiment have a refractive index which changes (decreases) rapidly (steeply) near the melting point. Therefore, if the refractive index of the fine particles at the temperature lower than the melting point is set to be a value close to that of the base resin, the refractive indexes of these two will be close to each other at the temperature lower than the melting point, and the difference in the refractive indexes of these two will become larger at the temperature equal to or more than the melting point. Hence, the light control film (hereinafter referred to as "thermosensitive light control film") containing the fine particles becomes transparent at the temperature lower than the melting point, and it gets white turbid or the like and becomes non-transparent at the temperature equal to or more than the melting point. In this way, the fine particles of the present embodiment can control transparency and non-transparency of the light control film by the temperature because they use changes in an optical property (refractive index) of the side chain crystal polymer in addition to the thermosensitivity of the side chain crystal polymer, and the changes to the transparent and the non-transparent are steeper than conventional ones such as the light control mixture. Additionally, by the fine particles of the present embodiment, the properties of the base resin are not easily degraded. By the fine particles of the present embodiment, the refractive index can be adjusted by the material to be copolymerized, and transparency and non-transparency can be controlled with respect to the base resin having any refractive index.

The temperature at which the thermosensitive light control film changes from transparent to non-transparent can be controlled by the melting point of the side chain crystal polymer. The degree of the non-transparency (turbidity), such as white turbidity, can be controlled by a composition of monomer component constituting the side chain crystal polymer, a mixing ratio of the base resin and the fine particles, or the like. The thermosensitive light control film can repeatedly be transparent and non-transparent because the side chain crystal polymer reversibly undergoes a crystal state and a fluid state in response to temperature changes. The transparency and the non-transparency (the light control function) in the thermosensitive light control film may be an extent which can be recognized visually.

The refractive indexes of the fine particles are, for example, 1.480 to 1.520 at the temperature lower than the melting point, and 1.440 to 1.495 at the temperature equal to or more than the melting point. The refractive index is a value measured by an automatic refractometer. The refractive indexes of the fine particles are not limited to the illustrated numerical ranges. The refractive indexes of the fine particles can be set according to the refractive index of the base resin.

In the fine particles, a difference (an absolute value) between the refractive index at the temperature lower than the melting point and the refractive index at the temperature equal to or more than the melting point is 0.010 or more, and preferably 0.010 to 0.070. In this case, the thermosensitive light control film is likely to change significantly from transparent to non-transparent.

If the fine particles are for light control, the monomer component constituting the side chain crystal polymer may include a refractive index adjusting monomer. The refractive index adjusting monomer may be a monomer having a refractive index of 1.300 to 1.600. Examples of the refractive index adjusting monomer include 2-(0-phenylphenoxy) ethyl acrylate (the refractive index: 1.577), 2-propenoic acid (3-phenoxyphenyl) methyl ester (the refractive index: 1.566), 1-naphthyl acrylate (the refractive index: 1.595), acrylamide (the refractive index: 1.515), hydroxyacrylamide (the refractive index: 1.515), EO-modified bisphenol A diacrylate (the refractive index: 1.537), acrylamide (the refractive index: 1.515), 2,2,2-trifluoroethyl acrylate (the refractive index: 1.348), methacrylic modified polydimethylsiloxane (the refractive index: 1.408). Only one kind of the illustrated refractive index adjusting monomers may be used, or two or more kinds of them may be used in combination. The refractive index adjusting monomer is preferably contained in the monomer component constituting the side chain crystal polymer in a proportion of 40% or less by weight, and more preferably 1 to 30% by weight.

When the fine particles are for light control, the composition of the side chain crystal polymer may be, for example, 20 to 100 parts by weight of (meth)acrylate having the straight-chain alkyl group having 14 or more carbon atoms, 0 to 40 parts by weight of monofunctional monomer, 0 to 10 parts by weight of multifunctional monomer, and 0 to 30 parts by weight of the refractive index adjusting monomer.

The fine particles may be added to a proportion that causes the thermosensitive light control film to exhibit the thermosensitivity derived from the side chain crystal polymer. It means that the thermosensitive light control film may contain the fine particles in a proportion at which the light control function by the fine particles can be obtained. For example, an amount of the fine particles is 5 to 45% by weight. An amount of the base resin is, for example, 55% to 95% by weight. In the thermosensitive light control film, the base resin may be contained in a higher ratio by weight than the fine particles. Specifically, a weight ratio of the base resin to the fine particles may be 95:5 to 55:45. The respective amounts of the fine particles and the base resin are not limited to the numerical ranges illustrated.

At the temperature lower than the melting point, a difference (an absolute value) between a refractive index of the fine particles and a refractive index of the base resin may be less than 0.020, preferably 0.001 or more and less than 0.020. Additionally, at the temperature equal to or more than the melting point, a difference (an absolute value) between a refractive index of the fine particles and a refractive index of the base resin may be 0.020 or more, and preferably 0.020 to 0.050. In these cases, the thermosensitive light control film changes significantly from transparent to non-transparent. As to the refractive index of the base resin, for example, when an ethylene-methyl methacrylate copolymer resin (or a methyl methacrylate resin) is used as the base resin, the refractive index may be 1.480 to 1.520 at the temperature lower than the melting point, and 1.450 to 1.500 at the temperature equal to or more than the melting point.

Examples of the base resin of the thermosensitive light control film include a polyethylene terephthalate resin, a polyvinyl chloride resin, an ethylene-methyl methacrylate copolymer resin, polycarbonate, a methyl methacrylate resin, polyvinyl butyral, polyvinyl acetate, an ethylene vinyl acetate copolymer resin (EVA), and a polyolefin resin. The polyolefin resin includes, for example, a polyethylene resin or the like. The polyethylene resin may be, for example, a straight-chain low-density polyethylene resin (LLDPE), a low-density polyethylene resin (LDPE) or the like. Two or more base resins may be mixed and used together. The weight average molecular weight of the base resin is not particularly limited.

A thickness of the thermosensitive light control film is preferably 10 to 500 μm, and more preferably 40 to 150 μm. The thermosensitive light control film is a concept that covers from the film-shape to the sheet-shape without being limited only to the film-shape, as long as the effect of the present embodiment is not impaired. In other words, the thermosensitive light control film may be referred to as a thermosensitive light control sheet.

In the above-described embodiment, the case that the thermosensitive light control film is transparent at the temperature lower than the melting point and is non-transparent at the temperature equal to or more than the melting point is explained as an example, but the transparent and the non-transparent of the thermosensitive light control film can be reversed. That is, the thermosensitive light control film may be non-transparent at the temperature lower than the melting point and is transparent at the temperature equal to or more than the melting point. In constituting such a thermosensitive light control film, a refractive index of the fine particles at the temperature lower than the melting point may be set to a value far from the refractive index of the base resin, and the refractive index of the fine particles at the temperature equal to or more than the melting point may be set to a value close to the refractive index of the base resin.

(For Plasticizer)

A case where fine particles are for plasticizer is described below.

When common plasticizers are added to improve processability of resin materials at high temperatures, their properties in the room temperature range (for example in a temperature range of −20 to 40° C.) are also reduced.

Even if the fine particles of the present embodiment are added to improve the processability of resin materials at high temperatures, their properties at room temperature are unlikely to be reduced. Additionally, plasticity can be imparted at any temperature by adjusting the melting point. Therefore, for example, it is possible to improve molding processability, such as reducing torque of an extruder, while maintaining the properties of the resin materials in the room temperature range.

A weight ratio of the base resin to the fine particles may be 9:1 to 1:9. The fine particles alone may be used as a plasticizer, or the one in which the fine particles are added to a general purpose resin such as a polyethylene resin may be used as a plasticizer.

<Method for Manufacturing Thermosensitive Fine Particles>

A method for manufacturing thermosensitive fine particles according to an embodiment of the present invention is described below.

In the present embodiment, the fine particles are obtained by polymerizing the monomer component constituting the side chain crystal polymer. Methods for polymerizing the monomer component include an emulsion polymerization method, a suspension polymerization method, a miniemulsion polymerization method or the like. At the time of polymerization, for example, an aqueous medium, a surfactant, a polymerization initiator and the like may be used.

For example, an aqueous medium and a surfactant may be added to the monomer component to obtain a mixed solution, the mixed solution may be stirred by stirring means to form the monomer component into particles, and then the polymerization initiator may be further added to polymerize the monomer component.

Examples of the stirring means include a homogenizer. Stirring conditions may be, for example, a rotation speed of 5000 to 20000 rpm, stirring time of 1 to 20 minutes, and liquid temperature of 40 to 90° C. The liquid temperature at the time of polymerizing the monomer component may be, for example, 40 to 90° C.

Examples of the aqueous medium include water. The amount of aqueous medium added is preferably 50 to 90% by weight with respect to 100% by weight of the total of the monomer component and the aqueous medium.

Examples of the surfactant include an anionic surfactant, a cationic surfactant, an amphoteric ionic surfactant, a nonionic surfactant, and a reactive surfactant. The amount of surfactant added is preferably 0.5 to 7 parts by weight in terms of solid content with respect to 100 parts by weight of the monomer component.

Examples of the polymerization initiator include persulfates and azo compounds. Specific examples include potassium persulfate, 2,2'-Azobis[N-(2-carboxyethyl)-2-methyl-propionamidine]tetrahydrate, 2,2'-Azobis(2-methylpropionamidine) dihydrochloride, and lauroyl peroxide. The amount of polymerization initiator added is preferably 0.05 to 2 parts by weight with respect to 100 parts by weight of the monomer component.

The present invention is described in detail below by illustrating Synthetic Examples and Examples. However, the present invention is not limited to the following Synthetic Examples and Examples.

Synthetic Examples 1 to 7: Thermosensitive Fine Particles

First, monomers shown in Table 1 were added to a reaction vessel in the proportions shown in Table 1. The monomers shown in Table 1 are as follows.

C18A: stearyl acrylate
C16A: cetyl acrylate
C12A: lauryl acrylate
AA: acrylic acid
Multifunctional monomer (A): trimethylolpropane triacrylate
Multifunctional monomer (B): 1,6-hexanediol diacrylate
HRD-01: 2-(0-phenylphenoxy) ethyl acrylate, which is a high refractive index monomer, manufactured by Nisshoku Techno Fine Chemical Co., Ltd.

Next, a mixed solution was obtained by adding an aqueous medium and a surfactant to a reaction vessel. Water was used as the aqueous medium. The surfactants added were as follows.

Synthesis Example 1: Adeka Reasoap SR-10, which is a reactive anionic surfactant, manufactured by ADEKA Corporation Synthesis Examples 2 to 7: Aqualon AR-10, which is a reactive anionic surfactant, manufactured by DKS Co. Ltd.

The amount of aqueous medium added was 80% by weight with respect to 100% by weight of the total of the monomer component and the aqueous medium. The amount of surfactant added was 1 part by weight in terms of solid content with respect to 100 parts by weight of the monomer component.

Next, the mixed solution was stirred by stirring means to form the monomer component into particles. The stirring conditions were as follows.

Stirring means: homogenizer (main body: AHG-160D, rotor: HT1025) manufactured by AS ONE Corporation
Rotation speed of Synthetic Examples 1 to 2: 15000 rpm
Rotation speed of Synthetic Examples 3 to 7: 7500 rpm
Stirring time: 5 minutes
Liquid temperature: 40° C.

Finally, a polymerization initiator was added to the reaction vessel, and thermosensitive fine particles were obtained by polymerizing the monomer component. The aqueous medium was then removed by carrying out suction filtration and vacuum drying. The polymerization initiators added were as follows.

Synthetic Example 1: 2,2'-Azobis[N-(2-carboxyethyl)-2-methylpropionamidine]tetrahydrate Synthetic Examples 2 to 7: Lauroyl peroxide The amount of polymerization initiator added was 1 part by weight with respect to 100 parts by weight of the monomer component. The liquid temperatures for polymerizing the monomer component were as follows.

Synthetic Example 1: 65° C.
Synthetic Examples 2 to 7: 67° C.

Mean particle diameters and melting points were measured for the thermosensitive fine particles obtained in Synthesis Examples 1 to 7. For Synthesis Example 1, a storage elastic modulus G' was also measured. Each measurement method was described below, and the results were also shown in Table 1.

(Mean Particle Diameter)

The mean particle diameter was obtained by taking a SEM photograph of the fine particles (magnification: 1000 times) by using a SEM, processing the obtained SEM photograph to randomly select 30 particles, and calculating the average value.

(Melting Point)

The melting point was measured under a measurement condition of 10° C./min by using a DSC.

(Storage Elastic Modulus G')

The storage elastic modulus at the melting point−10° C. and the storage elastic modulus G' at the melting point+10° C. were measured by HAAKE MARSIII, which is a dynamic viscoelasticity measuring device, manufactured by Thermo Scientific Inc by setting the frequency to 1 Hz, the load to 3.00 N, and the heating spead to 5° C./min, in a temperature increasing process from 0 to 100° C. after the temperature was decreased from 60° C. to 0° C. A ratio [(the storage elastic modulus G' at the melting point−10° C.)/(the storage elastic modulus G' at the melting point+10° C.)] was calculated by using the measurement results.

Example 1

<Production of Test Piece>

First, a polyethylene resin and fine particles obtained in Synthesis Example 1 were mixed in a weight ratio of 7:3.

Next, a test piece was obtained by kneading the obtained mixture and forming it into a sheet having a thickness of 1 mm. Kneading was performed at 150° C. for 15 minutes by using a labo plastmill manufactured by Toyo Seiki Seisakusho, Ltd.

<Evaluations>

The storage elastic modulus G' was measured for the obtained test piece. The storage elastic modulus G' was measured in the same way as in Synthetic Example described above. The results are shown in FIG. 1.

Comparative Example 1

A test piece was obtained by forming the polyethylene resin used in Example 1 into a sheet having a thickness of 1 mm. The storage elastic modulus G' of the test piece was then measured in the same way as in Example 1. The results are shown in FIG. 1.

As shown in FIG. 1, Example 1 has a storage elastic modulus G' similar to that of Comparative Example 1 at the temperature lower than the melting point, and the storage elastic modulus G' is lower than that of Comparative Example 1, indicating that a softening function is exhibited at the temperature equal to or more than the melting point. The results indicate that the thermosensitive fine particles can control the properties of the base resin, such as the elastic modulus control, by temperature. It also shows that the thermosensitive fine particles can be used for plasticizers.

Examples 2 to 7

<Production of Thermosensitive Light Control Film>

First, a base resin and fine particles obtained in Synthesis Examples 2 to 7 were mixed in the combinations shown in

TABLE 1

| | Monomer Components[1] (parts by weight) | | | | | | | | | Storage Elastic Modulus G' (Pa) | | |
|---|---|---|---|---|---|---|---|---|---|---|---|---|
| | C18A | C16A | C12A | AA | Multi-functional monomer (A) | Multi-functional monomer (B) | HRD-01 | Mean Diameter Particle (μm) | Melting Point (° C.) | Melting point −10° C. | Melting point +10° C. | Ratio[2] |
| Synthetic Example 1 | 25 | 75 | — | — | 1 | — | — | 3.1 | 40 | 3 × 10$^7$ | 1 × 10$^4$ | 3 × 10$^3$ |
| Synthetic Example 2 | 25 | 75 | — | — | — | 0.2 | — | 3.0 | 40 | — | — | — |
| Synthetic Example 3 | 25 | 75 | — | — | — | 0.2 | — | 7.8 | 40 | — | — | — |
| Synthetic Example 4 | 25 | 75 | — | — | — | 5 | — | 8.1 | 36 | — | — | — |
| Synthetic Example 5 | 30 | 55 | — | 5 | — | 0.2 | 10 | 7.0 | 37 | — | — | — |
| Synthetic Example 6 | 35 | 40 | — | 5 | — | 0.2 | 20 | 7.3 | 35 | — | — | — |
| Synthetic Example 7 | 70 | — | 30 | — | — | 0.2 | — | 7.5 | 37 | — | — | — |

[1]C18A: stearyl acrylate, C16A: cetyl acrylate, C12A: lauryl acrylate, AA: acrylic acid. Multifunctional monomer (A): trimethylolpropane triacrylate, Multifunctional monomer (B): 1,6-hexanediol diacrylate. HRD-01: 2-(O-phenylphenoxy) ethyl acrylate
[2]Ratio: (G' at the melting point −10° C.)/(G' at the melting point +10° C.)

Table 2. The weight ratio of the base resin to the fine particles was 90:10.

The base resins used were as follows.

EVA: "Ultrasen 630" manufactured by Tosoh Corporation
LLDPE: "Niporon L T240F" manufactured by Tosoh Corporation Then, a kneaded material was obtained by kneading the mixture at 150° C. for 15 minutes by using a labo plastmill manufactured by Toyo Seiki Seisaku-sho, Ltd. Then, a light control film having a thickness of 100 μm was obtained by molding and processing the kneaded material by a press machine set at 140° C.

<Evaluations>

Light control functions of the light control films obtained in Examples 2 to 7 were evaluated. Specifically, first, the light control films were visually observed at room temperature (20° C.) Consequently, the light control films were transparent. Then, the light control films were heated to the temperature equal to or more than the melting point (the melting point+5° C.) by using a hair dryer and visually observed. Consequently, the light control films got white turbid. Then, the light control films were cooled to the room temperature again and visually observed. Consequently, the light control films became transparent. These results clearly show that in Examples 2 to 7, they are transparent at the temperature lower than the melting point and are non-transparent at the temperature equal to or more than the melting point. It can also be seen that in Examples 2 to 7, they repeatedly become transparent and non-transparent.

Haze is shown in Table 2. They were transparent when haze was less than 15%, and they got white turbid when haze was 15% or more. Haze was a value measured by CM3600, which is a spectrophotometer, manufactured by Konica Minolta, Inc.

The refractive indexes of the base resin and the fine particles at 20° C. and the melting point+5° C. are shown in Table 2. The refractive indexes were values measured by "Abbemat 350", which is an automatic refractometer, manufactured by Anton Paar GmbH.

The invention claimed is:

1. Thermosensitive fine particles comprising:

a side chain crystal polymer which is crystallized at a temperature lower than a melting point of the side chain crystal polymer and which exhibits fluidity at a temperature equal to or more than the melting point of the side chain crystal polymer, wherein the side chain crystal polymer includes 20 to 100 parts by weight of a (meth)acrylate having a straight-chain alkyl group having 14 or more carbon atoms, 0 to 40 parts by weight of monofunctional monomer, and 0 to 10 parts by weight of multifunctional monomer, wherein a difference between a refractive index of the thermosensitive fine particles at a temperature lower than the melting point of the side chain crystal polymer and a refractive index at a temperature equal to or more than the melting point of the side chain crystal polymer is 0.010 or more, and the thermosensitive fine particles have a mean particle diameter of 0.1 to 50 μm.

2. The thermosensitive fine particles according to claim 1 wherein the thermosensitive fine particles contain no organic solvents.

3. The thermosensitive fine particles according to claim 1 wherein the thermosensitive fine particles are a thermosensitive imparting agent.

4. The thermosensitive fine particles according to claim 1, wherein the thermosensitive fine particles are for light control.

5. The thermosensitive fine particles according to claim 1, wherein the thermosensitive fine particles have refractive indexes of 1.480 to 1.520 at the temperature lower than the melting point of the side chain crystal polymer and 1.440 to 1.495 at temperature equal to or more than the melting point of the side chain crystal polymer.

TABLE 2

| | Base Resin | | | Fine Particles | | | Light Control Haze (%) | | Light Control Function Appearance | |
|---|---|---|---|---|---|---|---|---|---|---|
| | | Refractive Index | | | Refractive Index | | | | | |
| | Type | 20° C. | Melting Point +5° C. | Type | 20° C. | Melting Point +5° C. | 20° C. | Melting Point +5° C. | 20° C. | Melting Point +5° C. |
| Example 2 | EVA | 1.502 | 1.490 | Synthetic Example 2 | 1.490 | 1.463 | 5 | 40 | Transparency | White turbidity |
| Example 3 | EVA | 1.502 | 1.490 | Synthetic Example 3 | 1.490 | 1.463 | 5 | 35 | Transparency | White turbidity |
| Example 4 | EVA | 1.502 | 1.492 | Synthetic Example 4 | 1.488 | 1.465 | 9 | 43 | Transparency | White turbidity |
| Example 5 | LLDPE | 1.515 | 1.507 | Synthetic Example 5 | 1.500 | 1.476 | 12 | 42 | Transparency | White turbidity |
| Example 6 | LLDPE | 1.515 | 1.507 | Synthetic Example 6 | 1.507 | 1.483 | 9 | 30 | Transparency | White turbidity |
| Example 7 | EVA | 1.502 | 1.492 | Synthetic | 1.488 | 1.463 | 10 | 37 | Transparency | White turbidity |

6. The thermosensitive fine particles according to claim 1, wherein the side chain crystal polymer further includes a refractive index adjusting monomer that has a refractive index of 1.300 to 1.600.

* * * * *